(12) United States Patent
Robinson (10) Patent No.: US 11,035,645 B1
(45) Date of Patent: Jun. 15, 2021

(54) DETACHABLE PISTOL-MOUNTABLE CAMERA AND VIDEO CAPTURE APPARATUS

(71) Applicant: Adam Robinson, Richfield, UT (US)

(72) Inventor: Adam Robinson, Richfield, UT (US)

( * ) Notice: Subject to any disclaimer, the term of this patent is extended or adjusted under 35 U.S.C. 154(b) by 0 days.

(21) Appl. No.: 16/886,341

(22) Filed: May 28, 2020

(51) Int. Cl.
*F41C 27/00* (2006.01)
*H04N 5/225* (2006.01)
*H04N 7/18* (2006.01)

(52) U.S. Cl.
CPC ........... *F41C 27/00* (2013.01); *H04N 5/2252* (2013.01); *H04N 5/2253* (2013.01); *H04N 7/18* (2013.01)

(58) Field of Classification Search
CPC ...................................................... F41C 27/00
See application file for complete search history.

(56) References Cited

U.S. PATENT DOCUMENTS

| 4,001,847 | A  | * | 1/1977  | McGrath  | G03B 15/003 396/360 |
| 2003/0029897 | A1 | * | 2/2003  | Beletsky | F41C 33/0227 224/661 |
| 2008/0112698 | A1 | * | 5/2008  | Ray      | G03B 29/00 396/56 |
| 2015/0369554 | A1 | * | 12/2015 | Kramer   | H04N 9/8205 386/227 |
| 2017/0370679 | A1 | * | 12/2017 | Willmann | F41A 21/325 |
| 2019/0093985 | A1 | * | 3/2019  | Robinson | H04N 5/91 |

\* cited by examiner

*Primary Examiner* — Paulos M Natnael
(74) *Attorney, Agent, or Firm* — Steven Rinehart (57) ABSTRACT

An apparatus and detachable recoding system for a firearm, the apparatus and system magnetically-detachable to a forward edge of a trigger guard of a firearm, the camera system comprising video recording means and a magnetic field proximity sensor in some embodiments. The apparatus and system are adapted to be activated when the firearm is withdrawn from a holster having a permanent magnet, and to record whatever the firearm is being pointed at whenever the firearm is drawn from a holster and not is proximity to a magnet within the holster.

16 Claims, 6 Drawing Sheets

DETACHABLE PISTOL-MOUNTABLE CAMERA AND VIDEO CAPTURE APPARATUS

BACKGROUND

Field of the Invention

This invention relates to firearms, and more particularly relates to camera and recording devices for firearms and law enforcement.

Description of the Related Art

Along with the proliferation of smart phones and tablet computers equipped with digital cameras has come increased attention on police shootings, which have become more commonly recorded with these cameras. Many jurisdictions now require police officers to wear body cameras or other auxiliary recording apparati on the officer's person or within the officer's patrol vehicle. These cameras, however, are not always activated, practical or efficient. Police offers are sometimes unable to activate body cameras in times of duress and even when activated, these cameras are not always oriented properly to capture important events.

In present art, the mechanisms provided for activating a camera typically require depressing a button or activating some other type of manual switching apparatus which can hinder or delay an officer in a shooting or exigent event. Light-activated cameras may not work is darkness or dim environments. It is desirable to equip a handgun or rifle with an auxiliary camera which is always oriented in the proper direction and which automatically activates in a crisis situation, but such a mechanism is unknown in the art. Accordingly, it is an object of the present invention is to provide a magnetically-activated apparatus that automatically switches on an integrated media recording apparatus which is detachable to a firearm.

SUMMARY

From the foregoing discussion, it should be apparent that a need exists for a pistol-mounted detachable camera and video capture apparatus. Beneficially, such a device would overcome inefficiencies with the prior art by providing a detachable device with a self-contained power supply.

The present invention has been developed in response to the present state of the art, and in particular, in response to the problems and needs in the art that have not yet been fully solved by currently available apparati. Accordingly, the present invention has been developed to provide a pistol-mountable camera, the pistol-mountable camera comprising: a housing having an elongate horizontal leg and an elongate vertical leg, the horizontal leg and vertical leg connected by an elongate diagonal member, the housing comprising a hollow interior recess adapted to house a plurality of electrical components; a wireless transceiver; a power supply; a microphone; flash computer memory for storing digital media; a forward-facing digital camera affixed to a forward surface of the vertical the leg, the camera having a lens, the lens of the digital camera oriented such that the camera points toward anything positioned in front of the firearm; a magnetic field sensor adapted to detect the presence of a permanent magnetic disposed in a holster; and two or more prongs affixed to the housing at proximal ends, the prongs extending rearwardly from the housing, the prongs each comprising inwardly-pointing cantilevers affixed at distal ends of the prongs, the cantilevers defining a trigger guard recess forming behind the housing and between the cantilevers.

The vertical leg, horizontal leg and diagonal member may all be formed as a single integrated piece.

The housing may be fabricated entirely from a ferromagnetized material, the housing being a permanent magnet, the vertical leg of the housing adapted to detachably affix using magnetic force to a forward edge of a trigger guard of a firearm, the horizontal leg adapted to affix to a lower edge of a frame of the firearm beneath a barrel of the firearm.

In some embodiments, the rearward surface of the housing and the upper surface of the housing may be affixed to a flexible magnetic strip.

The camera may be positioned beneath the microphone, memory, power supply, and wireless transceiver to give the camera increased field of vision.

The camera may be positioned at a base of the trigger guard to give the camera increased field of vision.

The pistol-mountable camera of claim 1, wherein the horizontal leg is hingedly affixed to the diagonal member.

The vertical leg may be hingedly affixed to the diagonal member in various embodiments.

A pistol-mountable camera system is also provided, the camera system comprising: a housing having an elongate horizontal leg and an elongate vertical leg, the horizontal leg and vertical leg connected by an elongate diagonal member, the housing comprising a hollow interior recess adapted to house a plurality of electrical components; a wireless transceiver; a power supply; a microphone; flash computer memory for storing digital media; a forward-facing digital camera affixed to a forward surface of the vertical the leg, the camera having a lens, the lens of the digital camera oriented such that the camera points toward anything positioned in front of the firearm; a magnetic field sensor adapted to detect the presence of a permanent magnetic disposed in a holster; two or more prongs affixed to the housing at proximal ends, the prongs extending rearwardly from the housing, the prongs each comprising inwardly-pointing cantilevers affixed at distal ends of the prongs, the cantilevers defining a trigger guard recess forming behind the housing and between the cantilevers; and the holster comprises a permanent magnetic adapted to be detected by the magnetic field sensor.

The vertical leg, horizontal leg and diagonal member may all be formed as a single integrated piece.

The housing may be fabricated entirely from ferromagnetized material, the housing being a permanent magnet, the vertical leg of the housing adapted to detachably affix using magnetic force to a forward edge of a trigger guard of a firearm, the horizontal leg adapted to affix to a lower edge of a frame of the firearm beneath a barrel of the firearm.

The rearward surface of the housing and the upper surface of the housing may be affixed to a flexible magnetic strip.

The camera may be positioned beneath the microphone, memory, power supply, and wireless transceiver to give the camera increased field of vision.

The camera may be positioned at a base of the trigger guard to give the camera increased field of vision.

In some embodiments, the horizontal leg is hingedly affixed to the diagonal member.

The vertical leg may be hingedly affixed to the diagonal member.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings.

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
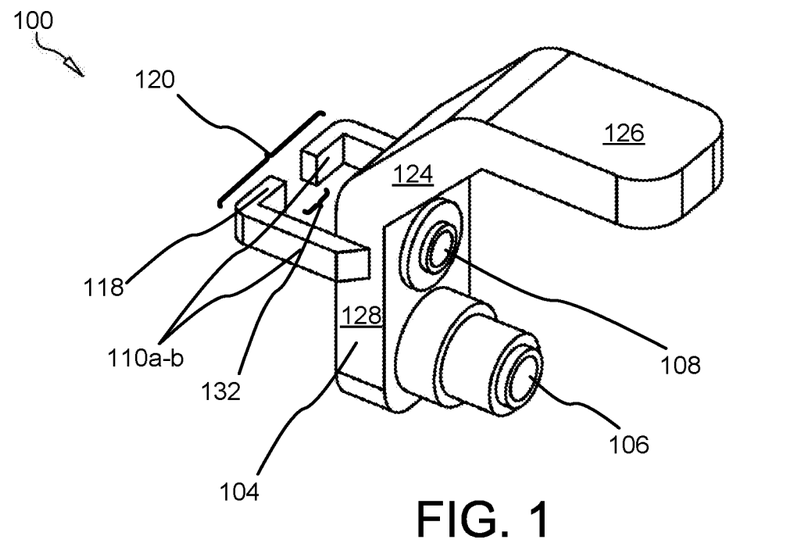
FIG. 1 is an isometric perspective view of a detachable pistol-mountable camera and video capture apparatus in accordance with the present invention.
Figure 2:
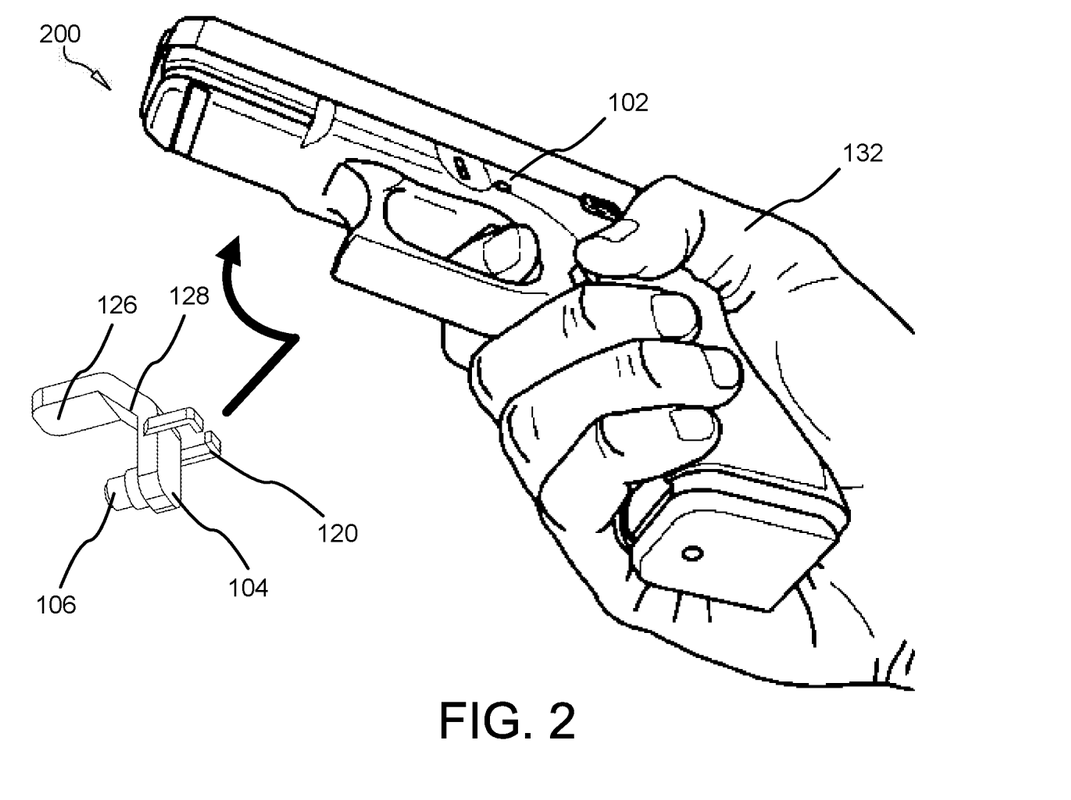
FIG. 2 is an environmental, lower perspective view of a detachable pistol-mountable camera and video capture apparatus in accordance with the present invention.

FIGS. 1-2 illustrate perspective views of a detachable pistol- or firearm-mounted camera and video capture apparatus 100, 200 in accordance with the present invention. The apparatus 100 comprises a corner-shaped housing defining a hollow interior recess containing a power supply and various other components. As further described below, from a side perspective the apparatus 100 may be quadrilaterally-shaped, triangular or in the shape roughly of an isosceles trapezoid. The apparatus 100 comprises a housing 104 having a vertical leg 128, a horizontal leg 126, and a diagonal member 124.

In various embodiments, the housing 104 is affixed to a digital camera 106, a microphone, and one of a microphone 108 and a light-sensor. The digital camera 106 is positioned beneath the other components on the exterior of the housing 104 such that the camera has a wider unobstructed field of view, whereas if the camera 106 which positioned higher toward the barrel of the firearm 102, the field of vision/view of the camera 106 would be more obstructed.

The prongs 100, as shown, position directly beneath the microphone 108 on the housing 104. The prongs 100 are affixed at their proximal ends to the housing 104. The prongs 110 are affixed at distal ends to the cantilevers 118.

The apparatus 200, or system 200 comprises, attachment means 120 for detachably affixing the housing 104 to a forward edge of the trigger guard 112 of the firearm 102. This attachment means 120 may include a brackets or prongs 110 which partially circumscribes a forward edge of the trigger guard 112. The attachment means 120 may comprise prongs 110a-b or claws which are affixed to the housing 104 and which grip a forward edge of the trigger guard 112. The prongs 110 comprise a cantilever 118 which is affixed at a substantially right angle to the main body of the prong 110. The cantilever 118a and the cantilever 118b of each prong 110 forma recess 132 between them which exceeds in width the width of the forward edge of the trigger guard 112 from a side perspective. The width of this recess 132, however, does not exceed the width of the forward edge of the trigger guard 112 from a forward perspective. This recess 132 is dimensioned such that the prongs 110 may insert over the trigger guard 112 from a lateral angle. In apparatus 100 may be slide onto the trigger guard from the side when angled at approximately 90 degrees, then the apparatus 100 may be rotated into a forward and secure position.

Figure 3:
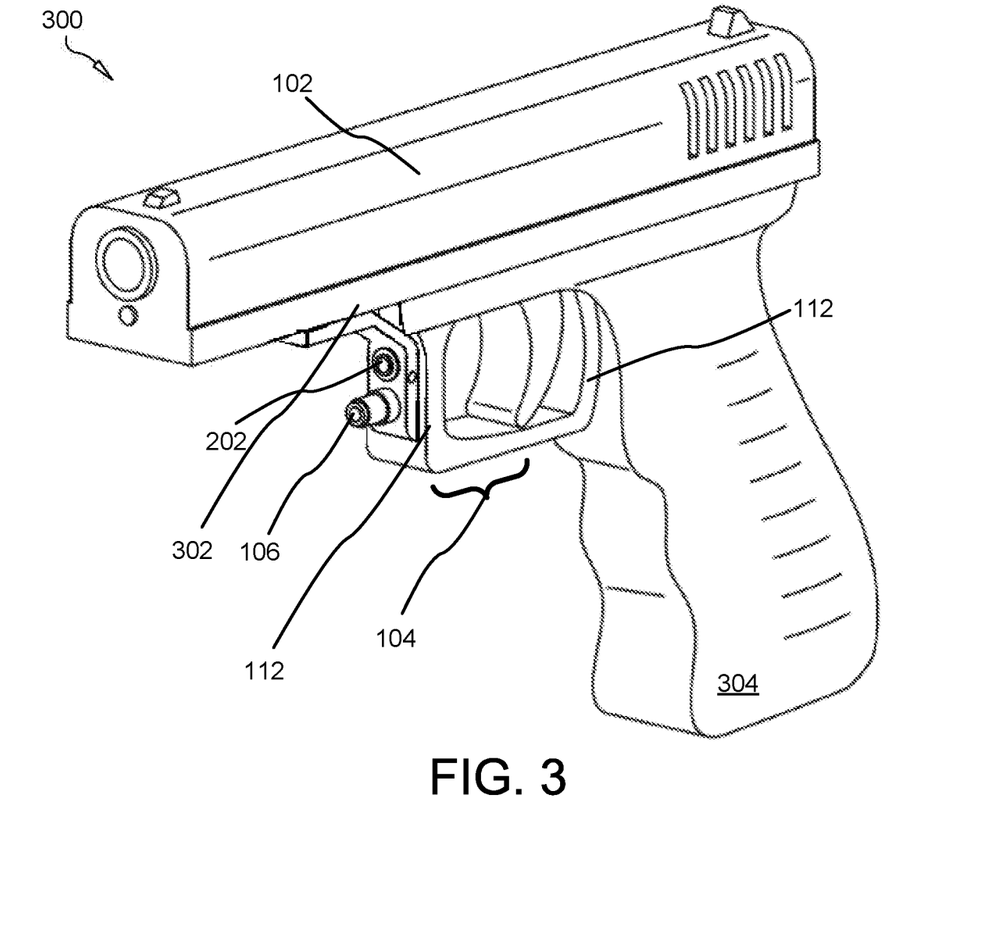
FIG. 3 is an environmental, forward perspective view of a detachable pistol-mountable camera and video capture apparatus in accordance with the present invention.

FIG. 3 is an environmental, forward perspective view of a detachable pistol-mountable camera and video capture apparatus 300 in accordance with the present invention.

The housing 104 is shaped to contour an exterior forward surface of a trigger guard 112 and also a lower surface of the frame 302 of the pistol 102. The frame 302 may be affixed to the handle 304 or formed therewith as a single integrated piece. In various embodiments, the diagonal member 124 is adapted to position on the forward upper corner of the trigger guard 112 where the trigger guard transitions in shape from having vertical forward surface to a horizontal lower surface.

The diagonal member 124 is the approximately the same length as the horizontal member 126 and the vertical member 128 in the shown embodiment. The lengths of the horizontal member 126, vertical member 128, and diagonal member 124 may all be equal. In some embodiments, the diagonal member 124 is 1 to 25% shorter in length than the vertical member 128 and the horizontal member 126.

The apparatus 100 may comprise a motion sensor and any device necessary for detecting motion of the firearm 102 which comprises the optical, microwave or acoustic means necessary for achieving such a function, including passive infrared (PIR), ultrasonic, and tomographic or a combination of any of the above as known to those of skill in the art.

The camera system 100 includes a digital camera 106 comprising a CMOS sensor and a lens assembly for recording video and/or still photographs. The video camera 106 may include a cylindrical body and is affixed to the housing 104. The video camera 106 is adapted to record media in computer-readable memory 508 housed within the housing 104.

The microphone 108 may be integrated into the camera 106 or the housing 104, and is well known to those of skill in the art.

In various embodiments, the apparatus 200 comprises a light-sensor for detecting light and switching on the digital camera and recording functionality. The light sensor may comprises any sensor of light or electromagnetic energy known to those of skill in the art, including a photoemission sensor, a photoelectric sensor, a photovoltaic sensor, a thermal sensor, a polarization sensor, a photochemical sensor and the like, or any combination of the above such that the apparatus 200 or system activates the digital camera 106 and recording functionality when the firearm 102 is drawn from a holster.

The horizontal leg 126 may alternatively magnetically affix to the body of the firearm barrel itself or to a rail underlying the barrel.

In the shown embodiment, the housing 104 protrudes forward by a further distance than shown in apparatus 100. The dimension of the housing 104 varies from one embodiment to the other and must be sufficient only to house a power supply, computer-readable memory 508 and/or a microphone and/or recording means. The housing 104 may be of any shape with any surfacing sufficient to support the recited components.

Figure 4:
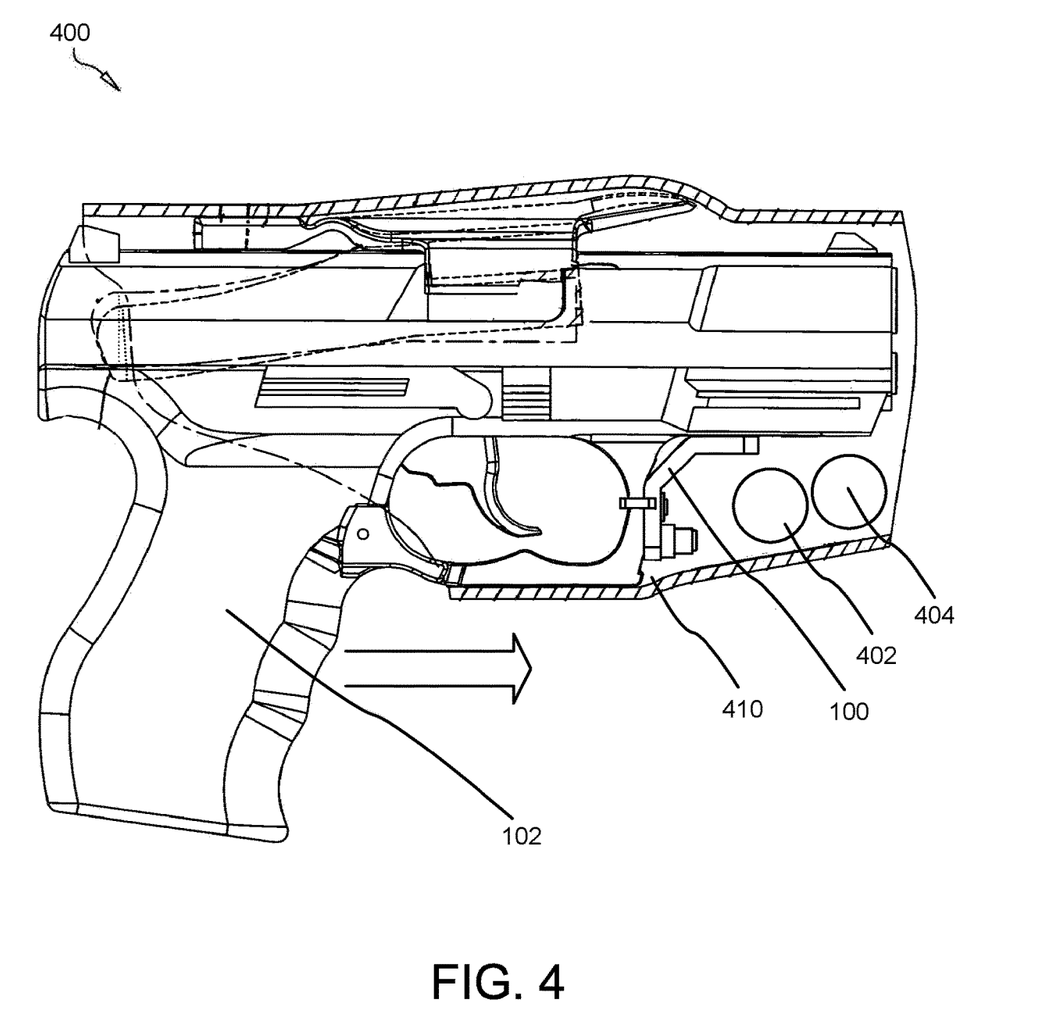
FIG. 4 is a side perspective view of a detachable pistol-mountable camera and video capture system in accordance with the present invention.

FIG. 4 is a side perspective view of a detachable pistol-mountable camera and video capture system 400 in accordance with the present invention.

The firearm 102 is mounted in a standard holster 410. Within the standard holster 410 are one or more proximity sensors (or magnetic field sensors) 402 adapted to detect the presence of the apparatus 100. The sensors 402 detect the changes to the presence of the terrestrial magnetic field created by the magnetic strip 552 and/or the apparatus 100. The sensors 402 trigger automatic recording of video and/or audio when the firearm 102 is withdrawn from the holster 410.

Figure 5A:
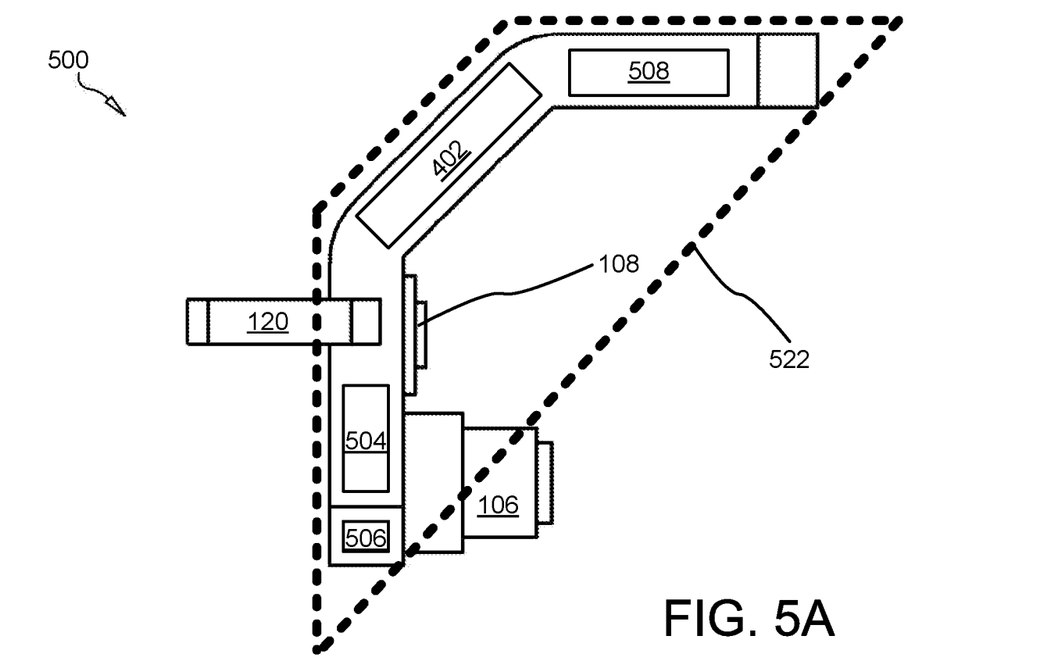
FIG. 5A is a sectioned, side perspective view of a detachable pistol-mountable camera and video capture apparatus in accordance with the present invention.

FIG. 5A is an upper perspective view of a detachable motion-activated recording apparatus 500 for firearms in accordance with the present invention. The apparatus 500 comprises a housing 104, a motion detector 502, a microphone 506, a digital camera 106, computer-readable memory 508, and a power supply 504.

In the shown embodiment, the housing 104 is roughly cylindrical, but recessed on its upper-rear surface to abut the forward-lower edge of the trigger guard 112 of the firearm 102. The attachment means 110 of the apparatus 500 circumscribes the lower edge of the trigger guard 112 rather than the forward edge. In this manner, the digital camera 106 is positioned further below the main body of the firearm 102 such that the barrel and slide do not obstruct the field of view of the digital camera 106.

As shown in FIG. 4, the firearm 102 is holstered in a holster 410. The firearm 102 may be drawn from the holster 410. The holster 402 comprises a plurality of magnetic switches 402. When the apparatus 400 in holstered, the magnetic surface 552 of the apparatus 400 interferes with an induced current in the magnetic switches 402 thus activating the camera 106 which records a predetermined length of video and/or audio in computer-readable memory 508. In various embodiments, the apparatus 400 may be configured to shut off recording when the computer readable memory is full, or to automatically overwrite recorded media when space is needed. In other embodiments, the apparatus 400 is configured to stop recording media after a predetermined period of time lapses without the sound of gunfire, or until manually switched off, or until the apparatus 400 is reholstered, its magnetic surface 552 coming back in contact with the magnetic proximity switch (or sensor) 402. In some embodiments, the system/apparatus 400 comprise a magnet 404 within the holster 410, while the apparatus 500 may comprise the magnetic field sensor 402.

By disposing the apparati 100-500 substantially on the forward edge of the trigger guard 112, the firearm 102 continues to rest in the holster 410 without modification of the holster 410. The apparatus 400 may cause the firearm 102 to sit higher in the holster 302, but does not obviate the utility of the holster 410. The magnetic switches and apparati 100-400 may used on most firearms 102 and in most standard holsters 410.

Figure 5B:
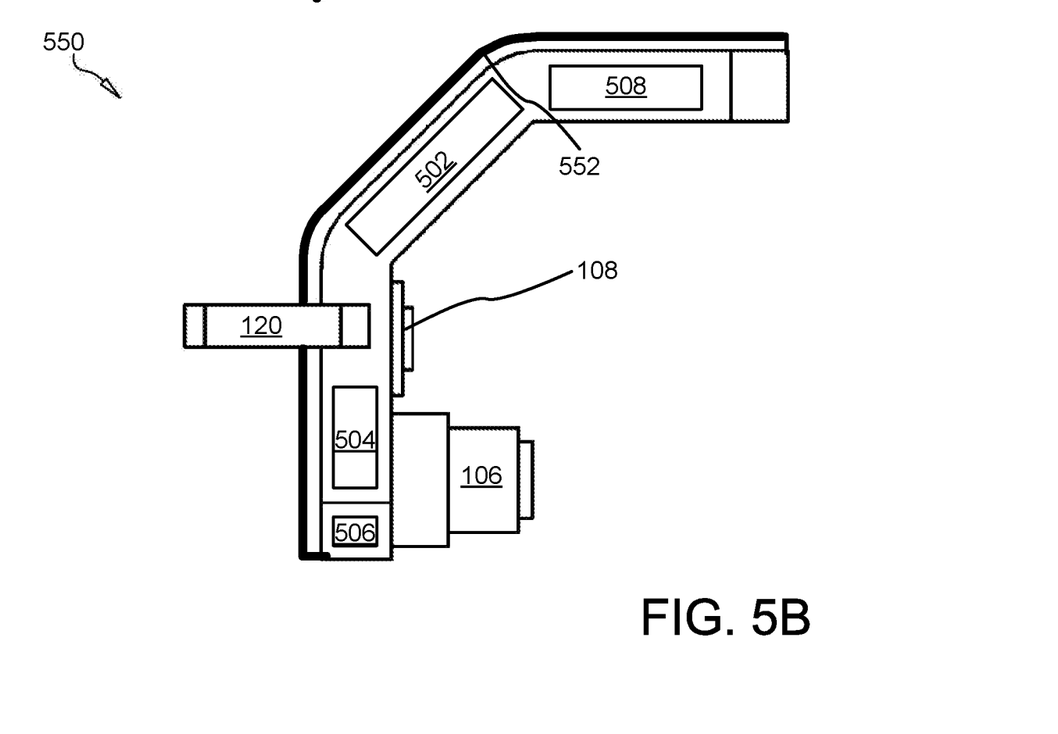
FIG. 5B is a sectioned, side perspective view of a detachable pistol-mountable camera and video capture apparatus in accordance with the present invention.

FIGS. 5A-5B illustrate sectioned, side perspective views of a detachable pistol-mountable camera and video capture apparatus 500, 550 in accordance with the present invention.

In some embodiments, the apparatus 500 from a side perspective substantially formed a quadrilateral or isosceles trapezoid 522 as shown were the vertical leg and horizontal legs connected with a hypotenuse.

The housing 104 comprises a hollow interior recess adapted to house a plurality of components adapted to impart function to the apparatus 500, including a power supply 504, memory 508, a wireless transceiver 504, and a processor 506. The apparatus 500 includes non-volatile, flash memory in place on conventional magnetic storage memory, would be unworkable with the magnetic housing surface 552. The memory 508 may additionally or alternatively comprise other non-magnetic storage, including FERAM, CBRAM, PRAM, STT-RAM, SONOS, RRAM, racetrack memory, millipede memory and the like.

The apparatus 550 may comprise a magnetic strip 552 affixed to a rearward and upper surface of the apparatus 550, adapted to magnetically attract ferromagnetic surfaces of a firearm.

In some embodiments, the apparatus 500 comprises a magnetic field sensor 402 as shown.

Figure 6:
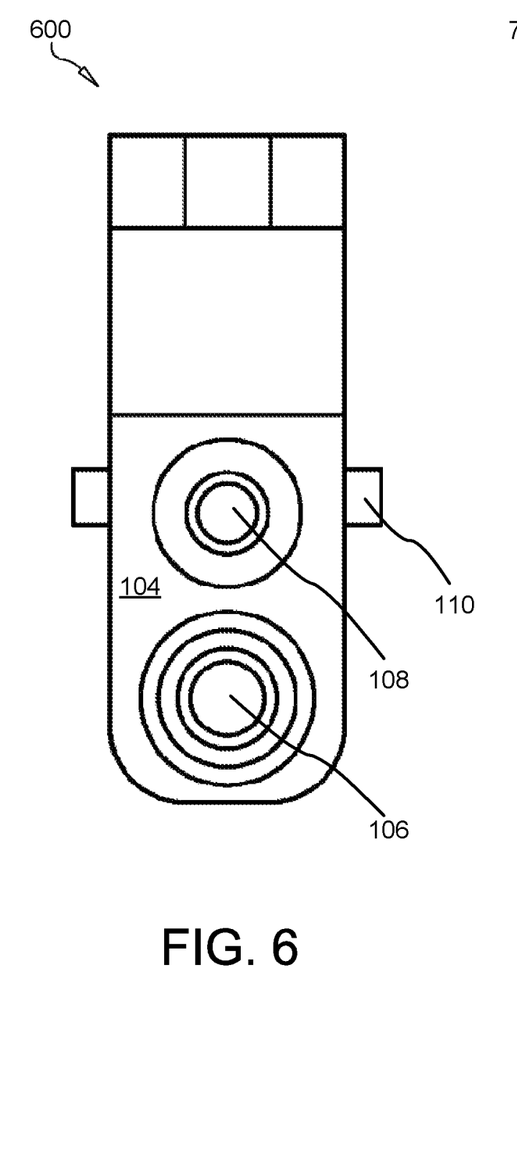
FIG. 6 is a forward perspective view of a detachable pistol-mountable camera and video capture apparatus in accordance with the present invention.

FIG. 6 is a forward perspective view of a detachable pistol-mountable camera and video capture apparatus 600 in accordance with the present invention.

The prong 110 juts laterally from the housing 104.

Figure 7:
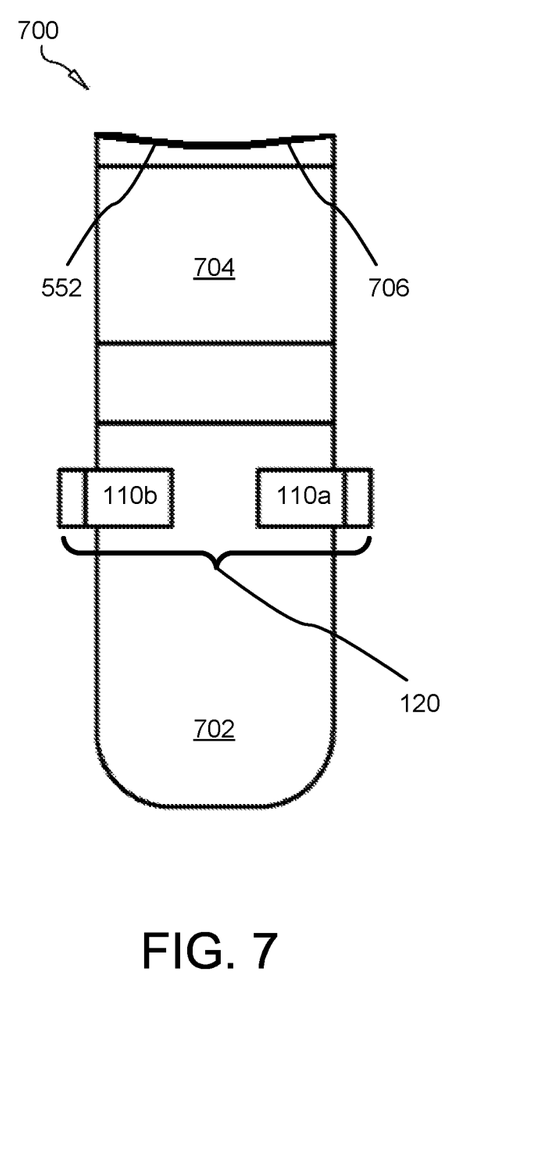
FIG. 7 is a rearward perspective view of a detachable pistol-mountable camera and video capture apparatus in accordance with the present invention.

FIG. 7 is a rearward perspective view of a detachable pistol-mountable camera and video capture apparatus in accordance with the present invention.

The housing 104 is magnetic across a rearward surface of the vertical leg 126 and across an upper surface of the horizontal leg 128. In various embodiments, the housing 104 is also magnetically-attractive across an upper-rearward surface of the diagonal leg 124.

In various embodiments, the top surface 706 of the horizontal leg 126 is concave, such that the concave top surface 706 is adapted to contour a lower surface of the firearm 102 frame. The rearward surface of the vertical leg 128 (or vertical member 128) may also be concave.

Figure 8:
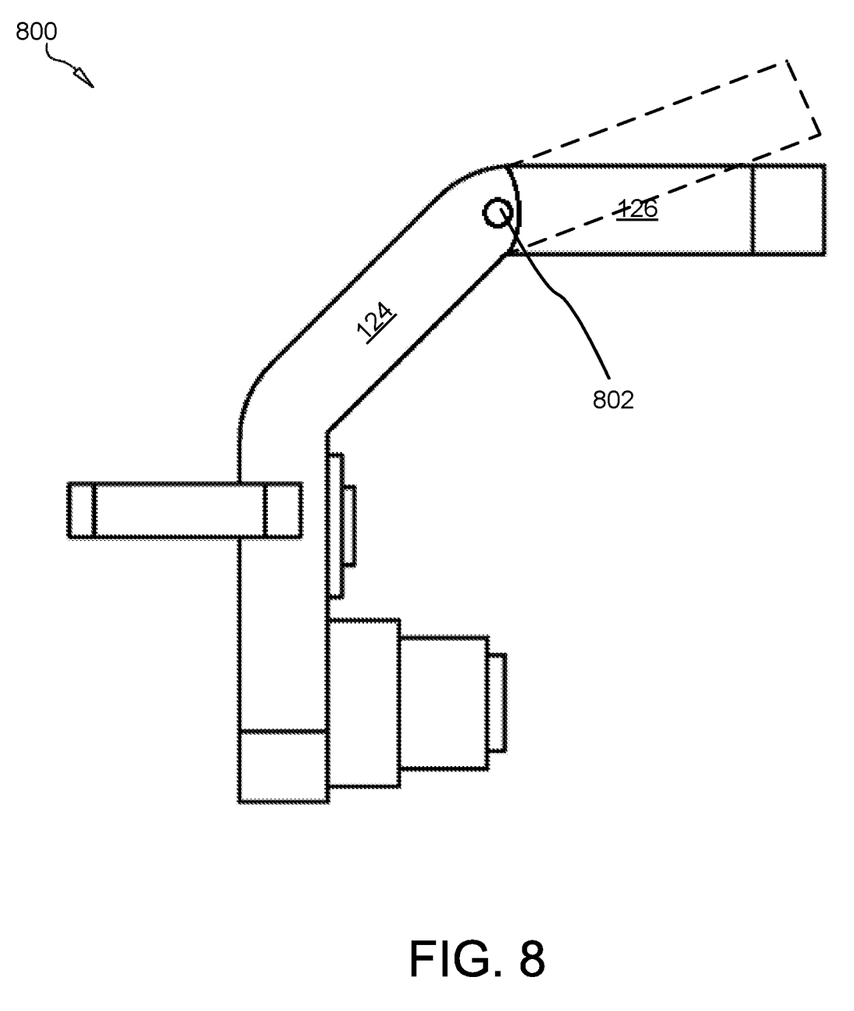
FIG. 8 is a side perspective view of a detachable pistol-mountable camera and video capture apparatus in accordance with the present invention.

FIG. 8 is a side perspective view of a detachable pistol-mountable camera and video capture apparatus 800 in accordance with the present invention.

As shown, the horizontal leg 126 may be hingedly affixed to the diagonal member 124 using a hinge 802. In this embodiment, it is not necessary that the barrel project at a substantially 90 degree angle from the trigger guard 112. In some embodiments, the diagonal member 124 is additionally or alternatively hingedly affixed to the vertical member 128.

Each of the apparati 100-800 may comprise or consist of the taught components and structural features.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pistol-mountable camera, the pistol-mountable camera comprising:
   a housing having an elongate horizontal leg and an elongate vertical leg, the horizontal leg and vertical leg connected by an elongate diagonal member, the housing comprising a hollow interior recess adapted to house a plurality of electrical components;
   wherein the diagonal member is 1 to 25% shorter in length than the vertical member and the horizontal member;
   wherein the horizontal leg is hingedly affixed to the diagonal member;
   wherein the vertical leg is hingedly affixed to the diagonal member;
   a wireless transceiver;
   a power supply;
   a microphone;
   flash computer memory for storing digital media;
   a forward-facing digital camera affixed to a forward surface of the vertical the leg, the camera having a lens, the lens of the digital camera oriented such that the camera points toward anything positioned in front of the firearm;
   a magnetic field sensor adapted to detect the presence of a permanent magnetic disposed in a holster; and
   two or more prongs affixed to the housing at proximal ends, the prongs extending rearwardly from the housing, the prongs each comprising inwardly-pointing cantilevers affixed at distal ends of the prongs, the prong defining a trigger guard recess forming behind the housing and between the cantilevers, wherein the trigger guard recess is narrower in diameter than a forward edge of a trigger guard to which the pistol-mounted detachable camera is affixed.

2. The pistol-mountable camera of claim 1, wherein the vertical leg, horizontal leg and diagonal member are all formed as a single integrated piece.

3. The pistol-mountable camera of claim 1, wherein the housing is fabricated entirely from ferromagnetized material, the housing being a permanent magnet, the vertical leg of the housing adapted to detachably affix using magnetic force to a forward edge of a trigger guard of a firearm, the horizontal leg adapted to affix to a lower edge of a frame of the firearm beneath a barrel of the firearm.

4. The pistol-mountable camera of claim 1, wherein the rearward surface of the housing and the upper surface of the housing are affixed to a flexible magnetic strip.

5. The pistol-mountable camera of claim 1, wherein the camera is positioned beneath the microphone, memory, power supply, and wireless transceiver to give the camera increased field of vision.

6. The pistol-mountable camera of claim 1, wherein the camera is positioned at a base of the trigger guard to give the camera increased field of vision.

7. The pistol-mountable camera of claim 1, wherein a top surface of the horizontal leg is concave.

8. A pistol-mountable camera system, the camera system comprising:
   a housing having an elongate horizontal leg and an elongate vertical leg, the horizontal leg and vertical leg connected by an elongate diagonal member, the housing comprising a hollow interior recess adapted to house a plurality of electrical components;
   wherein the diagonal member comprises four planar surfaces;
   wherein the horizontal leg is hingedly affixed to the diagonal member;
   wherein the vertical leg is hingedly affixed to the diagonal member;
   a wireless transceiver;
   a power supply;
   a microphone;
   flash computer memory for storing digital media;
   a forward-facing digital camera affixed to a forward surface of the vertical the leg, the camera having a lens, the lens of the digital camera oriented such that the camera points toward anything positioned in front of the firearm;
   a magnetic field sensor adapted to detect the presence of a permanent magnetic disposed in a holster;
   two or more prongs affixed to the housing at proximal ends, the prongs extending rearwardly from the housing, the prongs each comprising inwardly-pointing cantilevers affixed at distal ends of the prongs, the cantilevers defining a trigger guard recess forming behind the housing and between the cantilevers; and
   the holster comprises a permanent magnetic adapted to be detected by the magnetic field sensor.

9. The camera system of claim 8, wherein the vertical leg, horizontal leg and diagonal member are all formed as a single integrated piece.

10. The camera system of claim 8, wherein the housing is fabricated entirely from ferromagnetized material, the housing being a permanent magnet, the vertical leg of the housing adapted to detachably affix using magnetic force to a forward edge of a trigger guard of a firearm, the horizontal leg adapted to affix to a lower edge of a frame of the firearm beneath a barrel of the firearm.

11. The camera system of claim 8, wherein the rearward surface of the housing and the upper surface of the housing are affixed to a flexible magnetic strip.

12. The camera system of claim 8, wherein the camera is positioned beneath the microphone, memory, power supply, and wireless transceiver to give the camera increased field of vision.

13. The camera system of claim 8, wherein the camera is positioned at a base of the trigger guard to give the camera increased field of vision.

14. The camera system of claim 8, wherein the horizontal leg is hingedly affixed to the diagonal member.

15. The camera system of claim 8, wherein the vertical leg is hingedly affixed to the diagonal member.

16. The camera system of claim 8, wherein a top surface of the horizontal leg is concave.

\* \* \* \* \*